United States Patent
Shankar et al.

(10) Patent No.: US 10,820,191 B2
(45) Date of Patent: Oct. 27, 2020

(54) NETWORK COMMUNICATIONS FOR CONNECTED DEVICES

(71) Applicant: SORACOM, Inc., Setagaya-ku (JP)

(72) Inventors: Arun Shankar, Copenhagen (DK); Parag Mittal, Copenhagen (DK)

(73) Assignee: SORACOM, INC., Tokyo (JP)

(*) Notice: Subject to any disclaimer, the term of this patent is extended or adjusted under 35 U.S.C. 154(b) by 0 days.

(21) Appl. No.: 16/474,348

(22) PCT Filed: Dec. 22, 2017

(86) PCT No.: PCT/EP2017/084471
§ 371 (c)(1),
(2) Date: Jun. 27, 2019

(87) PCT Pub. No.: WO2018/122189
PCT Pub. Date: Jul. 5, 2018

(65) Prior Publication Data
US 2019/0342750 A1  Nov. 7, 2019

(30) Foreign Application Priority Data
Dec. 28, 2016 (EP) .................................. 16207107

(51) Int. Cl.
*H04W 8/26* (2009.01)
*H04W 12/00* (2009.01)
*H04W 8/18* (2009.01)
*H04W 8/20* (2009.01)
*H04W 12/06* (2009.01)

(52) U.S. Cl.
CPC ........... *H04W 8/265* (2013.01); *H04W 8/183* (2013.01); *H04W 8/205* (2013.01); *H04W 12/00514* (2019.01); *H04W 12/06* (2013.01)

(58) Field of Classification Search
CPC ..... H04W 8/265; H04W 8/183; H04W 8/205; H04W 12/00514; H04W 12/06
See application file for complete search history.

(56) References Cited

U.S. PATENT DOCUMENTS

| 9,491,563 B1 | 11/2016 | Hatton | |
|---|---|---|---|
| 2008/0052769 A1* | 2/2008 | Leone | H04W 12/06 726/7 |
| 2008/0113687 A1* | 5/2008 | Prendergast | H04W 12/06 455/558 |

(Continued)

FOREIGN PATENT DOCUMENTS

EP    2 114 063    11/2009

*Primary Examiner* — Wei Zhao
(74) *Attorney, Agent, or Firm* — Cozen O'Connor

(57) ABSTRACT

We describe a system for activating SI Ms, where the system comprises more SI Ms than will be authorised for use on a mobile network. The system comprises a plurality of SIMs, each of the SIMs being configured to provide a first SIM identifier. The first SIM identifiers are reused amongst said plurality of SIMs such that one of the SIMs may provide the same SIM identifier as another of the SIMs. The system includes a SIM authorisation server configured to receive the first SIM identifier from a SIM requesting activation and, in response, to provide a new SIM identifier. The new SIM identifier enables the SIM requesting activation to communicate traffic over the mobile network.

20 Claims, 10 Drawing Sheets

(56) References Cited

U.S. PATENT DOCUMENTS

2011/0244800 A1* 10/2011 Bogestam ............ H04W 76/14
                                                  455/41.2
2012/0115457 A1    5/2012  Bouckaert
2016/0080931 A1    3/2016  Marsden
2016/0174069 A1    6/2016  Bruner et al.

* cited by examiner

NETWORK COMMUNICATIONS FOR CONNECTED DEVICES

RELATED APPLICATIONS

This is a U.S. National Phase Application under 35 USC 371 of International Application PCT/EP2017/084471 filed on Dec. 22, 2017.

This application claims the priority of European application no. 16207107.0 filed Dec. 28, 2016, the entire content of which is hereby incorporated by reference.

FIELD OF THE INVENTION

The invention relates to systems, methods, apparatus, and computer programs or computer program products for use in network communications, in particular but not exclusively mobile telecommunications. Embodiments of the invention relate to connected devices for example of the type found in the Internet of Things (IoT), and in particular address problems related to the anticipated massive number of such devices and consequential huge database and related infrastructure requirements.

BACKGROUND TO THE INVENTION

The IoT has not grown as fast as it might have in part due to the overhead associated with massive deployments of connected devices. For example to communicate over the telecoms network a SIM card is used. If a unique identifier were provided for every device then corresponding infrastructure would be needed to allow every device to connect to a network. Such infrastructure would typically include, for example, extra memory at the network provider to store the identifiers and associated keys. This additional infrastructure, and other factors, translates into a financial cost for a company wishing to make available an internet or network enabled device. For example an additional per device cost of $5 might seem acceptable when considering a single SIM card but would be prohibitive when considering the deployment of a 100 Million SIM cards. Thus a reduction of these costs is critical to enable scaled deployment of connected devices.

One real world example is the deployment of connected cars. Typically SIM cards are incorporated in cars at time of manufacturing, but it may be 1 to 1.5 years before the car is sold to a customer. In this example since the car maker and connectivity provider are not certain when the car will be sold, they must keep the connectivity parameters stored and ready for use. This requires infrastructure that will not be used for some time and incurs a cost at a time when no revenue has been obtained.

In the example of a connected car it is generally the case that the device will be activated at sale, although the date is uncertain. However SIM activation in other use cases can be more random. Consider, for example, a company that makes and sells taxi meters to taxi companies and would like to offer additionally connectivity. The taxi company may have the choice of either using the available off-the-shelf connectivity option or of inserting their own SIM cards into their meters. Nonetheless provision must be made in the network for the pre-installed SIM cards to provide the option of on-board connectivity. However the cost of having potentially millions of non-active SIM cards provisioned in the network in this way is high, consequently making the price of such connected devices high. For example at today's prices it might typically cost around USD 1500 per month to have 1000 provisioned SIM cards in an optimized network setup which, for 1 million SIM cards increases to USD 1.5 million.

The infrastructure costs may include, for example the cost of an Mobile Station International Subscriber Directory Number (MSISDN), essentially an international phone number, and costs associated with provisioning SIM-related data in the network such as licence fee costs based on the number of subscribers. SIM-related data includes, for example, a unique serial number/Integrated Circuit Card Identifier (IC-CID), international mobile subscriber identity (IMSI) number, Authentication Keys (K), and so forth.

In one currently available approach to the previously outlined problems a temporary International Mobile Subscriber Identity (IMSI) is provided and when this is detected in the network a permanent IMSI and MSISDN are allocated to the SIM card to be used for end-user authentication and traffic. An approach of this general type is described in U.S. Pat. No. 9,491,563, referred to by the assignee as dynamic SIM allocation. However whilst this avoids the cost of the MSISDN it exacerbates the problems associated with provisioning SIM-related data in the network as there is now a requirement to have network elements handle both temporary and permanent identities.

As the skilled person will be aware, a "SIM" used herein may comprise a SIM card or a so-called eSIM (a module which may be embedded in a device), or a so-called softSIM or virtual SIM (a software SIM which may be stored, for example in a module of a device such as a communication module, and optionally downloaded over the air) or so-called secure element. The technology we describe is also applicable to SIMs other than SIM cards. Thus a SIM may be embodied in, for example, a UICC (Universal Integrated Circuit Card), eUICC, iUICC, and so forth.

There is therefore a need for improved solutions, in particular solutions which are scalable to the numbers of potentially connected devices with SIMs envisaged by the Internet of Things without concomitant costs in supporting infrastructure, such as massive databases and the like, which, in the end, may not be needed.

SUMMARY OF THE INVENTION

According to a first aspect of the invention there is therefore provided a system for activating SIMs, wherein the system comprises more SIMs than will be authorised for use on a mobile network, the system comprising: a plurality of SIMs, each of said SIMs being configured to provide a first SIM identifier, wherein one or more said first SIM identifiers is reused amongst said plurality of SIMs such that one of said plurality of SIMs may provide the same said SIM identifier as another of said plurality of SIMs; and a SIM authorisation server, configured to receive said first SIM identifier from a SIM requesting activation and, in response, to provide a new SIM identifier to said SIM requesting activation, wherein said new SIM identifier enables said SIM requesting activation to communicate traffic over said mobile network.

In an embodiment, by re-using the first SIM identifiers there is no need to for the system to be able to activate every SIM. Instead provision in the infrastructure may only be made for a smaller number of SIMs and then allocated to a particular SIM on activation.

In an embodiment once a particular first SIM identifier has been used to activate a SIM it cannot be re-used so the individual SIMs are provided with a mechanism to generate another first SIM identifier to be used instead, as described further later.

As the skilled person will know, broadly speaking an IMSI identifies a SIM (and/or associated device) and acts as a key to an MSISDN, essentially a phone number (which may change over time). Typically there is also a set of keys associated with the architecture, for example a User Equipment Security Key (K) and derived keys such as an Integrity Key (IK) and Ciphering Key (CK). The provision in the infrastructure may thus comprise, for example, storage of IMSI and/or MSISDN data so that when a SIM is activated these may be transferred to the activated SIM/device. An embodiment of the invention can provide savings of two or three orders of magnitude in the quantity of data which may need to be stored for a particular set of SIMs only a proportion of which may eventually be activated.

In some preferred embodiments each of the first SIM identifier and the new SIM identifier comprise an IMSI. Typically a SIM is associated with a connected device. The first SIM identifier (authentication IMSI) may thus allow an associated connected device to connect to the mobile network and communicate with the network. The activation request may therefore comprise an attempted authentication with the mobile network in order that the connected device can communicate with the network. If this is successful the SIM may be activated by receiving the new identifier or "traffic IMSI" (and preferably MSISDN) either indirectly or directly from the SIM authorisation server (it will be appreciated that many network topologies are possible). If, however, the authentication fails this may indicate that another SIM, also using this same first SIM identifier (authentication IMSI), has previously successfully activated itself. This is possible because there is re-use of the first SIM identifiers amongst the SIMs as described later.

In a preferred embodiment the first SIM identifiers have values within a defined set of values—for example a defined range of possible IMSI values. Preferably, however, the new SIM identifiers are not within this defined set of values, which makes it possible to determine, given an IMSI, whether the IMSI is a first SIM identifier (authentication IMSI), or a "traffic IMSI". This in turn facilitates the activation process since it allows a SIM, server or other network entity to determine whether the request for authentication was a request for normal authentication by a traffic IMSI or a request for a SIM activation. If the latter, the SIM is able then to provide a different first SIM identifier with which to re-try activation. In embodiments one or more keys may also be generated in conjunction with the different first SIM identifier, such as the User Equipment Security Key (K) mentioned above or the 3GPP MILENAGE secret key (OPc) described later.

The skilled person will understand that failure of the original request for activation of the SIM may be identified in a number of ways, for example an authentication failure signal from the network in response to the first SIM identifier, or failure to receive a "traffic IMSI", or in some other manner. The skilled person will also recognise that the exchange of messages between the UE/SIM and mobile network has been somewhat simplified to focus on the most relevant messages; in practice various other messages will also be exchanged.

In some preferred embodiments the SIM has associated computer readable storage medium storing processor control code and/or data for the SIM or representing the SIM. The skilled person will appreciate that this memory may, but need not be, physically on or part of a physical SIM card. In principle part or all of an entire set of first SIM identifiers may be stored in this memory but preferably a first SIM identifier from the set is generated by an algorithm running a code stored in this memory. This code may be configured to generate a succession of first SIM identifiers, for example a different identifier each time the code is invoked. The succession of identifiers may be an ordered succession, for example a sequence of numbers, or it may be substantially random. Preferably the algorithm is such that there is at least a reasonable probability that the generated identifiers completely span the allowed set; in embodiments this may be ensured, for example in a simple case simply by incrementing through a range.

Thus in a related aspect the invention provides a SIM for use in a system for activating SIMs, wherein the system comprises more SIMs than will be authorised for use on a mobile network, the SIM having an associated computer readable storage medium storing processor control code to: generate a first SIM identifier for activation of the SIM, wherein said generated first SIM identifier has a value from within a defined set of values; and update said first SIM identifier with a new SIM identifier received from a SIM authorisation server after activation of the SIM.

As previously described, in embodiments the first SIM identifier and the new SIM identifier each comprise an IMSI. Preferably, also as previously described, the processor control code is further configured to generate another first SIM identifier from the defined set of values (or a succession of such values) in response to failure of a request (or requests) for authentication of said SIM with the mobile network with an initial first SIM identifier.

The invention also provides a connected device including a SIM as described above. The device may comprise any device including, merely for the sake of example, a consumer or commercial electronics device, a machine or sensing device, a gaming, health-related or medical device, a vehicle, a home or utility device such as a lightbulb or lock, a clothing or sports device, and so forth.

The invention still further provides a SIM authorisation server for use a system for activating SIMs, wherein the system comprises more SIMs than will be authorised for use on a mobile network, the SIM authorisation server comprising a computer readable storage medium storing processor control code to receive a first SIM identifier from a SIM requesting activation and, in response, provide a new SIM identifier to said SIM requesting activation, wherein said first SIM identifier is from a set of first SIM identifiers smaller than a number of SIMs that may request activation such that two of said SIMs requesting activation may provide the same said first SIM identifier, wherein said new SIM identifier is not within said set of possible first SIM identifiers, and wherein said new SIM identifier is authenticatable by the mobile network to enable said SIM requesting activation to communicate traffic over a mobile network.

Embodiments of the invention may be used with an essentially unmodified mobile communications network but including a SIM authorisation server as described above, coupled to the network, to enable a SIM to send traffic over the network. Embodiments of the above-described SIM authorisation server may be implemented logically and/or physically together with or separately from such an existing network mechanism.

In a related aspect the invention provides a method of activating a connected a device such that the device is able to communicate traffic over a mobile network, the method comprising: using a device with a SIM, wherein said SIM is configured to provide a first SIM identifier selected from a set of possible first SIM identifiers; sending an activation request with said first SIM identifier from said device to a mobile network; receiving a response to said activation request; when said response includes a new SIM identifier, activating said device such that the device is able to communicate traffic over a mobile network, wherein said activating comprises updating said SIM with said new SIM identifier; and choosing a different first SIM identifier from said set of possible first SIM identifiers if said activating of said device has not taken place.

As previously described, in some preferred implementations the method is used in a system comprising a plurality of said connected devices each with a respective SIM. A first SIM may be activated and the method may then detect when a first SIM identifier of a subsequent device/SIM requesting activation conflicts with (for example, is the same as) the first SIM identifier of a previously activated device/SIM. Such a conflict may be detected by, for example, detecting failure of authentication of the subsequently connecting device/SIM. In this case the method preferably resolves the detected conflict by generating a different first SIM identifier for another try.

Another aspect of the invention provides a computer program product storing processor control code to implement the above-described method.

In a still further aspect the invention provides a connected device activated by a method as described above.

Thus in a further aspect, some embodiments provide a device comprising a processor, such as a microprocessor, a communication unit, for example a communication interface, and a storage unit for example a storage device or storage medium such as memory, a hard disc, and so forth. The processor is adapted to generate an identity such as aforementioned SIM identifier, from a sequence of known identities, such as a predictable sequence of potential such SIM identifiers. The device is adapted to transmit said identity, for example through the communication unit, to a network.

The processor may be provided by or on a SIM, or the processor may be provided by a connected device having an associated SIM, or the processing function may be distributed over a plurality of coupled elements in communication with one another in a manner known to those skilled in the art.

To allow connection to a network such as an IP network, for example the Internet or the like, over a standard telecoms network, a device may typically employ a one or more different identifiers and/or authentication keys, for example as previously outlined and as described in more detail below. In embodiments, the SIM stores an IMSI and a related key.

In embodiments a plurality of devices is deployed, each one provided with an algorithm to generate a number of different SIM identifiers in a sequence. Thus although each device can cycle through a range of different identifiers it is not necessary for each identifier to be stored on the device. In an embodiment, the number of devices deployed with the same algorithm (i.e. capable of cycling through the same sequence of identifiers) exceeds the number of identifiers in the sequence. Thus infrastructure can be put in place for the number of identifiers in the sequence as opposed to the total number of devices. In embodiments as it is not known which devices will be activated first, or even which devices will be activated at all, each device is provided with the same opportunity to connect.

In embodiments the device is adapted to transmit an authentication request into the network, and upon receiving a rejection of the authentication request, to generate a further identity from the sequence of known identities.

The above identifier, also referred to previously as a first SIM identifier, can be thought of as an authentication identifier. In embodiments the device is adapted to transmit an authentication request comprising the first SIM identifier, into the network and to receive a new identifier which is not part of the said sequence, from the network once said authentication request has been accepted. This new SIM identifier can be considered to be a traffic identifier. The device is preferably adapted to use this new SIM identifier as the identifier of the device from then on.

In embodiments the sequence of known identities may comprise the identities which are a fixed number of integers apart; the SIM or device may then cycle through the sequence in ascending or descending order. Alternatively the SIM or device may select identities at random from the sequence.

In preferred embodiments there is a known start point and/or end point for the sequence. This allows the device or the network to easily identify if it is handing a generated identity (from the sequence) or a "normal" (traffic) identity. Advantageously with this general approach, although the device is able to generate a number of identities the storage requirements for generating the sequence of numbers is less than for the amount of storage that would be required if the entire sequence was stored as individual numbers.

In embodiments, to authenticate a device on the network the network and the device may have access to the same or complementary cryptographic keys—for example in a manner known to those skilled in the art and/or as described in various mobile communications specification documents, in particular those relating to security architecture. In an embodiment, instead of storing the keys, the processor is adapted to generate a key from said generated identity. In one embodiment the keys may be generated from a network shared key and the current identity.

An identity may be or comprise an IMSI; more particularly an identity may be or comprise an IMSI-MSISDN pair.

In another aspect there is provided a SIM authorisation server comprising a database, a processor and having an interface to a network for communicating with a device, said server being adapted to: receive an authentication request comprising an identifier from a device; match said identifier in said database to retrieve a key, wherein said key is provided, more particularly generated, once a match with said identifier has been determined; and authenticate said device using said identifier and said key.

The above approach allows the keys to be generated once an identifier has been matched. This further saves memory at the network as there is no need to store the keys for every identifier in the database.

Further aspects and embodiments provide a server comprising a database and a network interface for communicating with a device, said server being adapted to: receive an authentication request comprising an identifier from a first device; receive an authentication request comprising the said identifier from a second device; match said identifier in said database to retrieve a key; perform an authentication procedure with said first and second devices using said identifier and said key; accept the authentication of said first device and transmit a new identifier to the said first device to use for further communications with the network; and reject the authentication of said second device.

According to one aspect of there is provided a system for activating SIMs, wherein the system comprises more SIMs than will be authorised for use on a mobile network, the system comprising: a plurality of SIMs, each of said SIMs being configured to provide an authentication identifier, wherein one or more said authentication identifiers is reused amongst said plurality of SIMs such that one of said plurality of SIMs may provide the same said authentication identifier as another of said plurality of SIMs wherein said authentication identifiers of said plurality of SIMs have values within a defined set of values; and a SIM authorisation server, configured to receive a said authentication identifier from a SIM requesting activation, determine whether said authentication identifier has been used to activate a SIM and, in response to a successful activation, to provide a traffic identifier to said SIM requesting activation and wherein said traffic identifier is not within said defined set of values, wherein said traffic identifier enables said SIM requesting activation to communicate traffic over said mobile network; and wherein, in response to failure of said activation said SIM requesting activation is configured to provide a different authentication identifier to said SIM authorisation server from the defined set of values, wherein said different authentication identifier is generated based on at least the said authentication identifier previously transmitted to the SIM authorisation server.

The said authentication identifier and said traffic identifier may each comprise an IMSI.

The SIM requesting activation may be configured to request activation by initiating an authentication request with said mobile network using the said authentication identifier.

The different authentication identifier may be generated by incrementing or decrementing, by a set amount, a least significant digit of the said authentication identifier previously transmitted to the SIM authorisation server. Alternatively, the different authentication identifier may be generated by incrementing or decrementing, by an amount chosen at random, a least significant digit of the said authentication identifier previously transmitted to the SIM authorisation server.

The said authentication identifier may be assigned to a pool of authentication identifiers, said pool being one of a plurality of pools of authentication identifiers and each pool comprising a set of unique authentication identifiers, and further wherein said different authentication identifier is assigned to a further pool of the plurality of pools.

The said authentication identifier may comprise a pool identifier digit and a plurality of lower-order digits randomly assigned to the SIM requesting activation at manufacture, and said different authentication identifier is generated by incrementing or decrementing said pool identifier digit.

Each authentication identifier in pool of the plurality of pools of authentication identifiers is either a prime number or can be created based on a multiplication using a prime number.

The SIM requesting activation may be configured to determine whether, in response to failure of a request for activation by one of said plurality of SIMs, an identifier used for said request for activation was a said authentication identifier or said traffic identifier, and to provide a different authentication identifier when said identifier used for said request for activation was a said authentication identifier.

Each of said SIM cards may have an associated computer readable storage medium storing processor control code to generate a plurality of said authentication identifiers from within a defined set of values.

According to another aspect there is provided a SIM for use in a system for activating SIMs, wherein the system comprises more SIMs than will be authorised for use on a mobile network, the SIM having an associated computer readable storage medium storing processor control code to: generate an authentication identifier for activation of the SIM, wherein said generated authentication identifier has a value from within a defined set of values; send an activation request with said authentication identifier to a SIM authorisation server in the mobile network; update said authentication identifier with a traffic identifier received from a SIM authorisation server after successful activation of the SIM; and in response to a failed activation of the SIM, generate a different authentication identifier from the defined set of values, wherein the different authentication identifier is generated based on the authentication identifier previously sent to the SIM authorisation server, and provide the different authentication identifier to said SIM authorisation server.

The authentication identifier and the traffic identifier may each comprise an IMSI.

According to another aspect there is provided a connected device including a SIM as described herein.

According to another aspect there is provided a method of activating a connected device such that the device is able to communicate traffic over a mobile network, the method comprising: using a device with a SIM, wherein said SIM is configured to provide a an authentication identifier selected from a set of possible authentication identifiers; sending an activation request with said authentication identifier from said device to a SIM authorisation server in the mobile network; receiving a response to said activation request from the SIM authorisation server; when said response includes a traffic identifier in response to a successful activation, activating said device such that the device is able to communicate traffic over a mobile network, wherein said activating comprises updating said SIM with said traffic identifier, wherein said traffic identifier is not within said set of possible first SIM identifiers; and choosing a different authentication identifier from said set of possible authentication identifiers if said activating of said device has not taken place, wherein the different said authentication identifier is generated based on the authentication identifier previously transmitted to the SIM authorisation server, and providing the different authentication identifier to the SIM authorisation server.

The authentication identifier and the traffic identifier may each comprise an IMSI.

There may be more of said connected devices than available authentication identifiers, and the method may further comprise: using a plurality of said connected devices each with a respective said SIM; activating one of said connected devices by receiving said new SIM identifier; detecting when an authentication identifier of a subsequent connected device requesting activation conflicts with the first SIM identifier of a previously activated connected device; and resolving the detected conflict by determining a different authentication identifier for said subsequent connected device. Embodiments of this aspect of the invention are able to handle two devices that are both using the same IMSI to attempt authentication over the network. This situation is to be expected as in embodiments each device will cycle through the same identifiers. Where such a clash occurs the system will follow the authentication procedure for both identifiers to check that both identifiers are genuine. However, only one device is supplied with a traffic ID and the authentication request from the other device is rejected. This rejection of the authentication request causes the other device to generate a further identifier.

The skilled person will appreciated that processor control code to implement the above-described systems, methods, servers, devices, and cards may run, for example, on a general purpose computer, a mobile computing or communications device, or on a digital signal processor (DSP) or across multiple processors. The code may be provided on a non-transitory physical data carrier such as a disk, CD- or DVD-ROM, programmed memory such as non-volatile memory (eg Flash) or read-only memory (Firmware). Code (and/or data) to implement embodiments of the invention may comprise source, object or executable code in a conventional programming language (interpreted or compiled) such as C, or assembly code, or code for a hardware description language. As the skilled person will appreciate such code and/or data may be distributed between a plurality of coupled components in communication with one another.

The skilled person will similarly understand that where references are made to a server this may be to one or multiple servers; again functionality may be distributed across devices. Similarly some or all of the storage/processing functions may be provided in the cloud, which may be a public cloud or a private cloud. As used herein "cloud" means a system that may dynamically perform provisioning and provide computing resources such as a CPU, a memory, a storage, and network bandwidth, for example according to a demand on the network. The skilled person will also understand that server software may be implemented on a physical computer or computer system which is at the same time running client software.

DETAILED DESCRIPTION OF PREFERRED EMBODIMENTS

In this specification, the following definitions/examples will be used:
  OTA: Over The Air. This covers any methodology of sending an update to the SIM (e.g. SMS, USSD, BIP-CAT_TP, BIP-HTTPs, and so forth)
  Authentication IMSI: The identity (IMSI), in an embodiment used for SIM authentication purposes only. Preferably it will not allow the end-user any other network access.
  Traffic Identity: The identity (IMSI) used by the end-user to enable use of a SIM for functions such as browsing of data, making calls, sending and receiving SMS, and so forth.
  IMSI: may be defined, for example, as IMSI: XXX YY 1234567890
    XXX: Denotes the MCC
    YY: Denotes the MNC
    1234567890: Denotes the MSIN, which is a number series defined by individual operators.
  MCC: Mobile Country code
  MNC: Mobile Network code
  MSIN: Mobile Station Identification Number.

Figure 1:
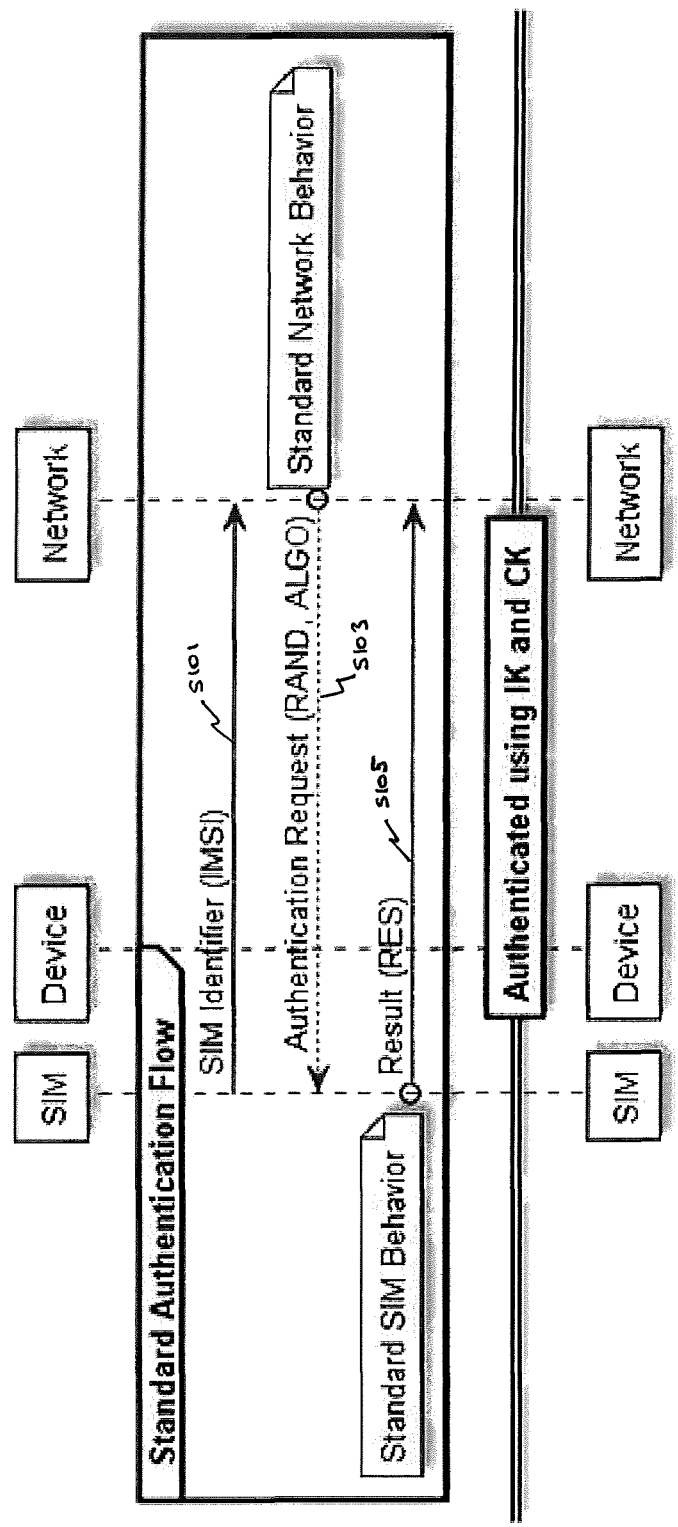
FIG. 1 shows a schematic of the process flow of an authentication procedure.

Referring to FIG. 1, this shows a flow chart of a standard authentication process which allows a SIM to be registered on a network. Here registration of a SIM on a network involves a set of messages by which the network allows a SIM which is associated with a subscription to use the network to communicate traffic.

As shown in FIG. 1, in response to the SIM identifier the network issues an authentication request to the SIM and evaluates the result to determine whether to accept or reject the authentication. This is standard network behaviour and embodiments of the invention described later do not need to modify this behaviour. Instead embodiments of the invention use the acceptance or rejection of an attempted authorisation of a SIM based on a SIM identifier as a mechanism to determine whether or not a SIM identifier is within a "forbidden" range, that is a range of IMSI numbers for which the network will not enable a SIM to communicate traffic over the network (by the above definition these are "Authentication IMSIs"). If an IMSI is within such a "forbidden" range when the SIM is authorised by a SIM authorisation server (as described later) it will be provided with a "working" traffic SIM.

In this example, the device comprises a SIM that allows it to communicate with the network, and a processor is provided on the SIM or in relation to the SIM. The SIM may be a physical SIM card that is inserted into the device or a physical module that is embedded into the device, and the SIM may also be pure software that is stored in the device and not physically separable from the device.

Prior to the process of FIG. 1, at least one secret key (K) is shared between the User Equipment (UE)/SIM and the network operator for authentication of the SIM. The key K may be stored in a database of the network operator, for example in an Authentication centre of the network operator; it may be provided to the SIM when the SIM is first installed in the device.

In step S101, the device retrieves the IMSI from the SIM and then sends the IMSI to the network provider. Upon receiving the IMSI, the network provider searches its database to match the IMSI received from the SIM and retrieves a corresponding key IK. IK is generated from the key K that was previously shared between the SIM and the network provider.

The network provider then generates a random number (RAND) and computes another number from RAND and IK. The computer number is split into two sections, a first section (RES from Network) and the encryption key CK.

The operator network then sends RAND to the device in step S103, which passes it to the SIM. The SIM signs it with its IK, producing a computed number which is again split into two sections RES from SIM and CK. RES from SIM is then passed to the device which the device then passes to the network operator in step S105

The network operator then compares the two RES numbers (RES from Network and RES from SIM). If the two numbers match, the SIM is authenticated and the device is granted access to the operator's network. CK is used to encrypt all further communications between the device and the network.

Once the above process has been completed the device can communicate with the network.

Figure 2A:
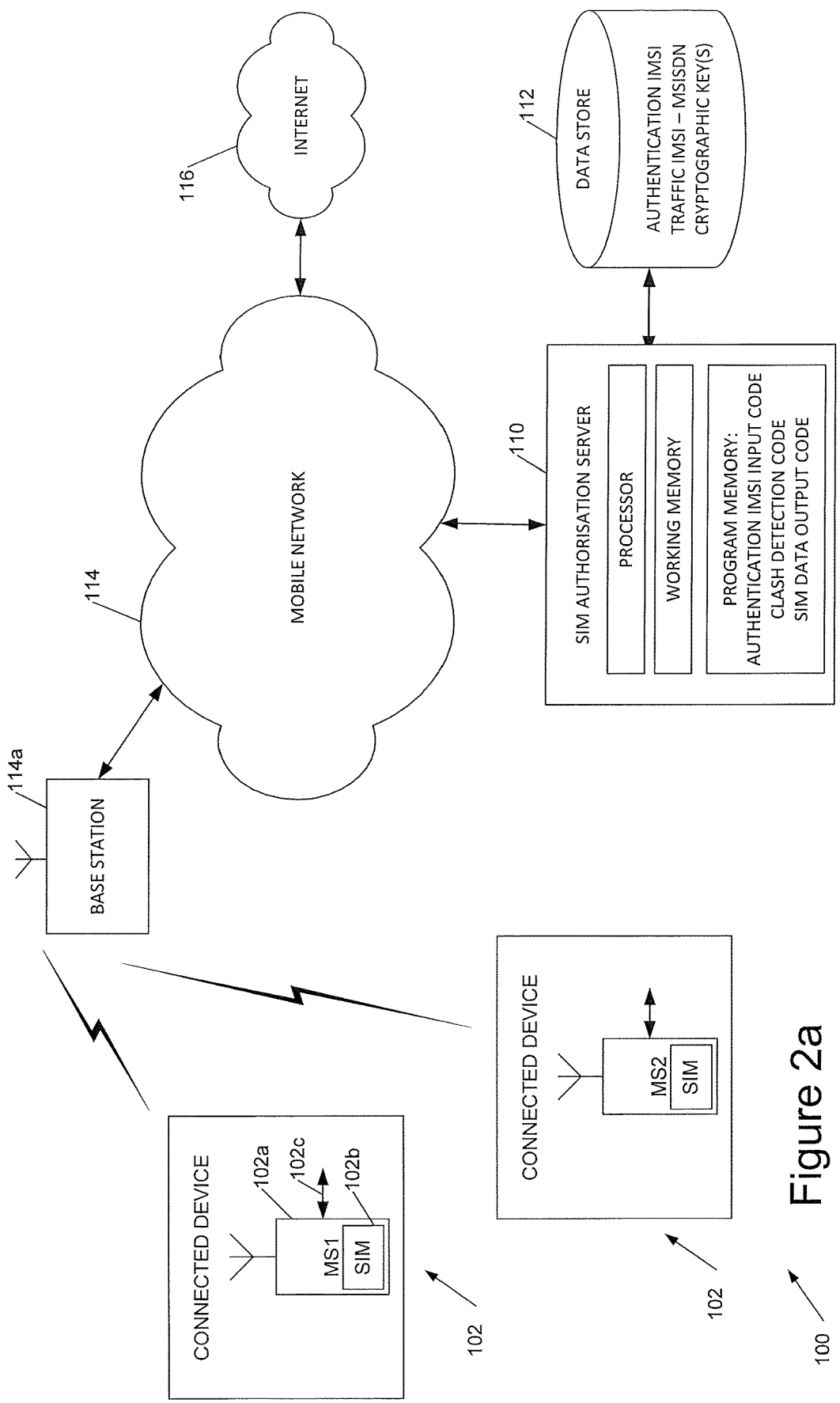
FIGS. 2*a* to 2*c* show, respectively, a block diagram of a system for activating SIMs according to an embodiment of the invention, a block diagram of a SIM for use with the system of FIG. 2*a*, and a flow diagram of a procedure for activating SIMs according to an embodiment of the invention.

Referring now to FIG. 2a, this shows a block diagram of a system 100 for activating SIMs according to an embodiment of the invention. The system comprises a mobile communications network 114 comprising conventional network elements and including a plurality of base stations 114a (of which only one is shown for illustration purposes) for communicating with mobile devices including a plurality of connected devices 102.

In the illustrated example mobile communications network 114 is also coupled to the Internet 116.

Each connected device 102 comprises a mobile station 102a for communicating with network 114 to provide a wireless data communication link 102c to the device, and having an associated SIM 102b.

The system also includes a SIM authorisation server 110 for activating a SIM. As illustrated this is shown as a separate element but in practice this may be implemented as an additional software component running on an existing network device or server. The SIM authorisation server 110 includes a processor, working memory and non-volatile program memory storing code to receive an authorisation (authentication) IMSI, to detect clashes between authorisation (authentication) IMSIs, and to provide SIM data for activating a SIM 102b, all as described in more detail later. The SIM authorisation server 110 is coupled to a database 112 (which again need not be a separate physical element) storing authentication IMSIs, paired traffic IMSIs and MSISDNs, and any necessary cryptographic key(s). The paired traffic IMSIs and MSISDNs are used to provide an activated SIM with an IMSI and MSISDN for use in communicating traffic over network 114, again as described later.

Figure 2B:
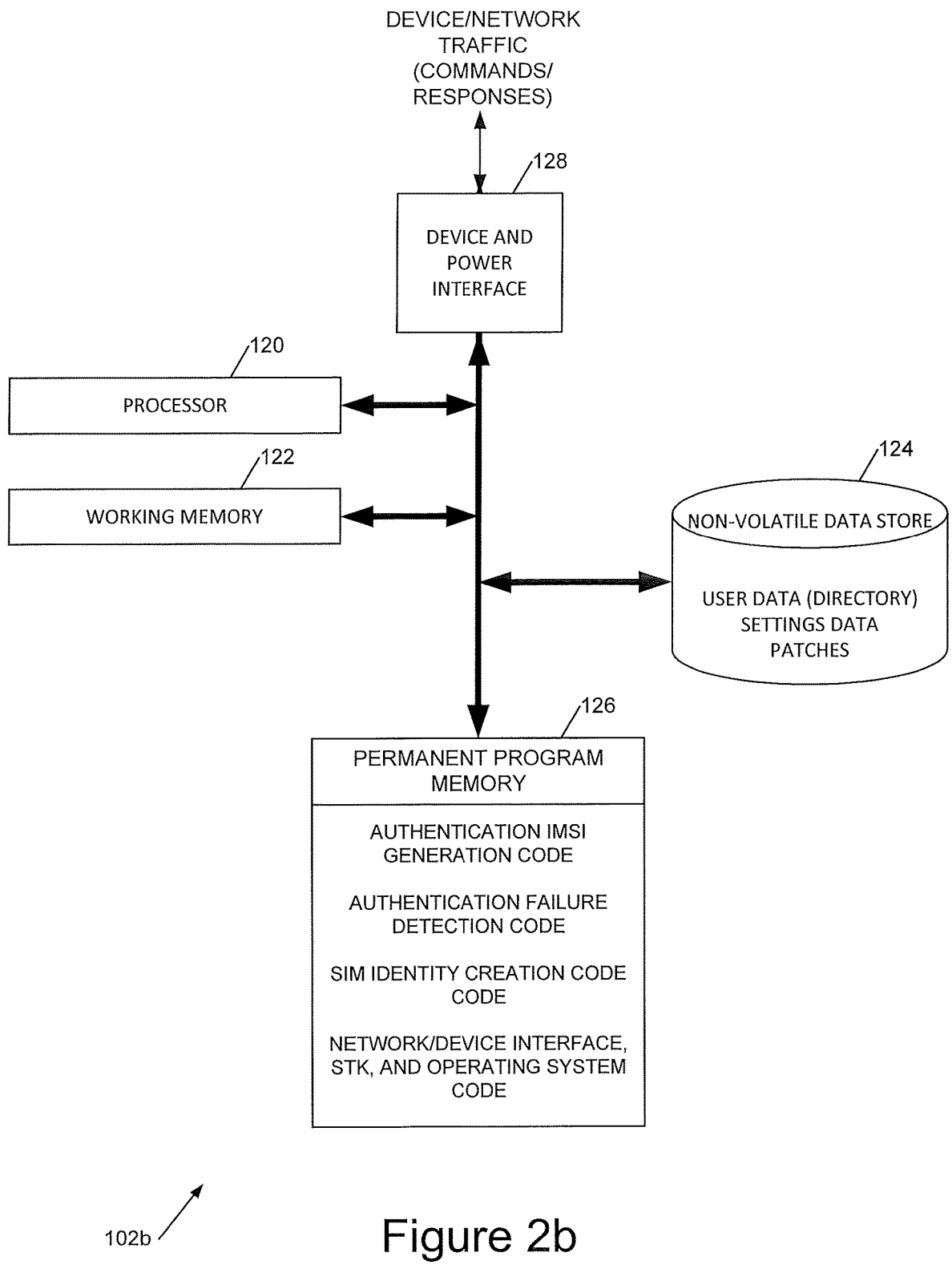

FIG. 2b shows a block diagram of an exemplary SIM card of a SIM 102b. The SIM card comprises a processor 120 coupled to working memory 122, a non-volatile data store 124, such as EEPROM, and permanent program memory 126 such as ROM. The SIM card also has an interface 128 to receive power and to accept commands from and provide responses to the device with which it is associated. The permanent program memory 126 stores network/device interface code, an operating system for example comprising Java Card, and typically though not essentially a Sim Application Toolkit (STK). The non-volatile data store 124 typically stores user phone directory information, settings data, software patches and the like.

As illustrated the SIM 102b is configured to implement an embodiment of the invention and includes further code to generate an authentication IMSI, code to detect failure of authentication of the SIM card, and code to generate a new identity for the SIM card. As illustrated this code resides in permanent program memory 126 but alternatively it could partly of wholly be stored in non-volatile data store 124.

As previously described, although FIG. 2b shows SIM 102b as a SIM card its functions could equally be implemented as an eSIM or a softSIM.

Figure 2C:
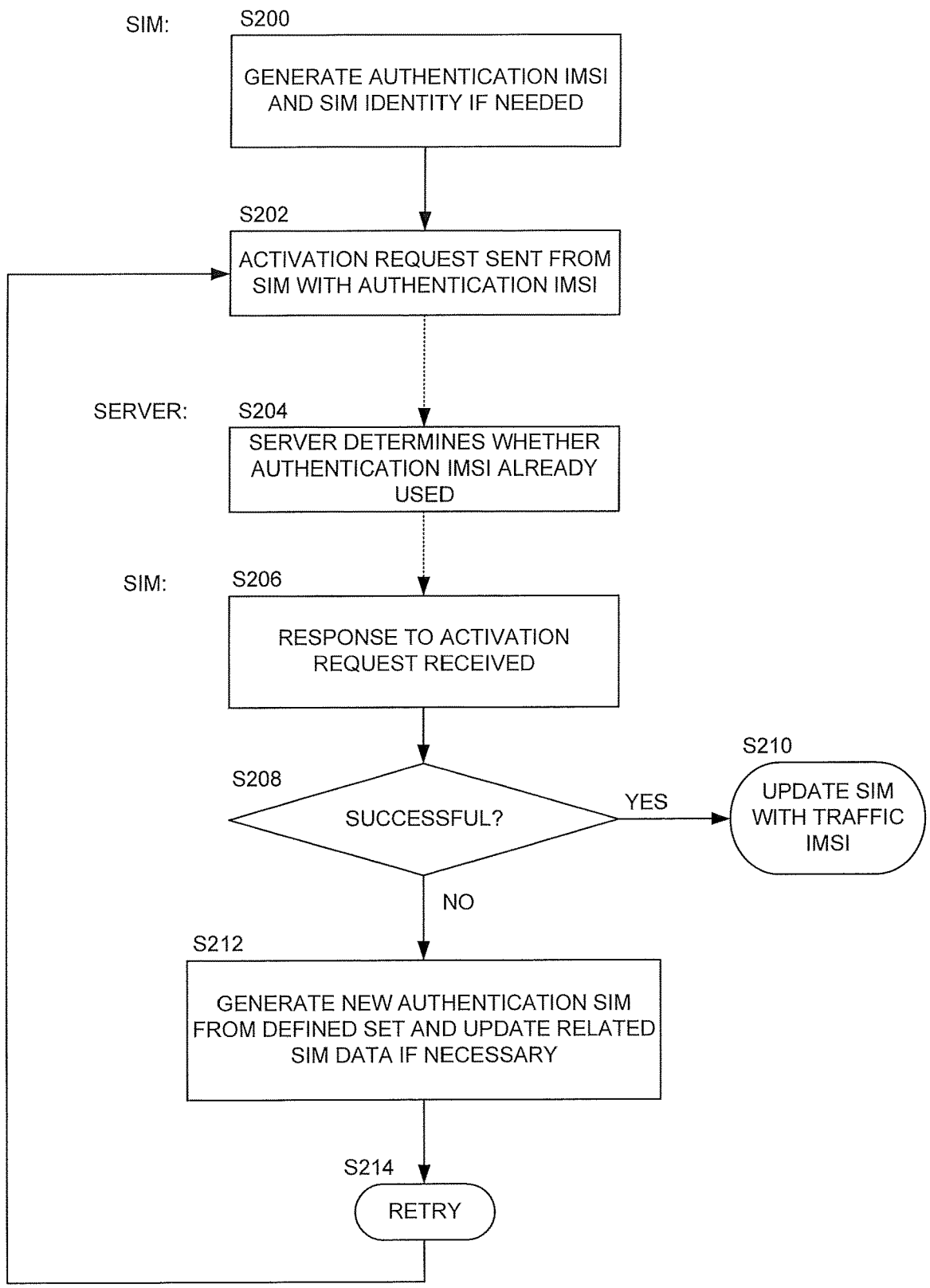

FIG. 2c shows a flow diagram of a procedure to implement an embodiment of the invention; more detailed embodiments are described later. Referring to FIG. 2c, the procedure begins with a SIM 102b generating an authentication IMSI from a defined set of permitted IMSIs and, if necessary, any accompanying data, such as cryptographic data, for the IMSI (S200). Alternatively an initial authentication IMSI could be pre-stored on the SIM.

The SIM then sends, via the mobile device, a SIM activation request to the network 114 for the authentication server 110 (S202). The server determines whether that authentication IMSI has already been used (S204) and responds to the activation request accordingly, failing to authenticate the SIM if the authentication IMSI has already been used and providing a traffic IMSI (and MSISDN) otherwise. The SIM receives the response (S206) and determines whether activation was successful (S208). If activation was successful the SIM is updated with the new (traffic) IMSI and MSISDN, optionally also updating any other data needed to communicate with the network using the new IMSI, such as cryptographic data (S210). If activation was unsuccessful the SIM generates a new, different authentication IMSI, and associated SIM data as required (S210), and retries (S214), looping back to the activation request (S202).

As explained above, one function of the SIM is to store the IMSI and the key IK that allows the device to communicate over a network. In the system of FIG. 2, the algorithm is configured to generate a sequence of IMSIs. The sequence of IMSIs is determined such that there is a relationship between the IMSIs in the sequence and thus the rules that define how the sequence of IMSIs are generated are stored on the SIM as opposed to each individual IMSI. Thus, there is no need to store each IMSI on the SIM.

First consider a simple example in which the algorithm is configured, say, to generate the following sequence of IMSIs: 001; 002; 003. When the device is first activated, the SIM first provides the IMSI 001 to the device. In the following description, this will be referred to as the authentication ID.

At the start, the authentication of the ID follows a similar process to that described with reference to FIG. 1. The IMSI is sent in step S101 and transmitted to the network provider. When received at the network provider, the IMSI is matched in the database in the same manner as for standard authentication. However, after step S105, once the SIM has been authenticated, a new IMSI is provided to the SIM by the network, this is the traffic IMSI that will be used for all further communications with the device. How the Traffic IMSI will be supplied will be described with reference to FIG. 8.

In an embodiment, a plurality of SIMs are provided where each SIM has the same algorithm and cycles through the same sequence of IMSIs. This allows the infrastructure to only be put in place for the number of IMSIs in the sequence. The number of SIMs supplied with this algorithm will be greater than the number of IMSIs in the sequence. If the SIMs are provided to devices which may or may not be used for communication over the Internet, then this means that it is only necessary to put in place the infrastructure for the number of indices in the sequence and not the total number of SIMs.

However, it is not possible for two SIMs to be authenticated on the network at the same time with the same IMSI. Therefore a process will next be described for handling a situation where two SIMs try to authenticate with the same IMSI.

Figure 3:
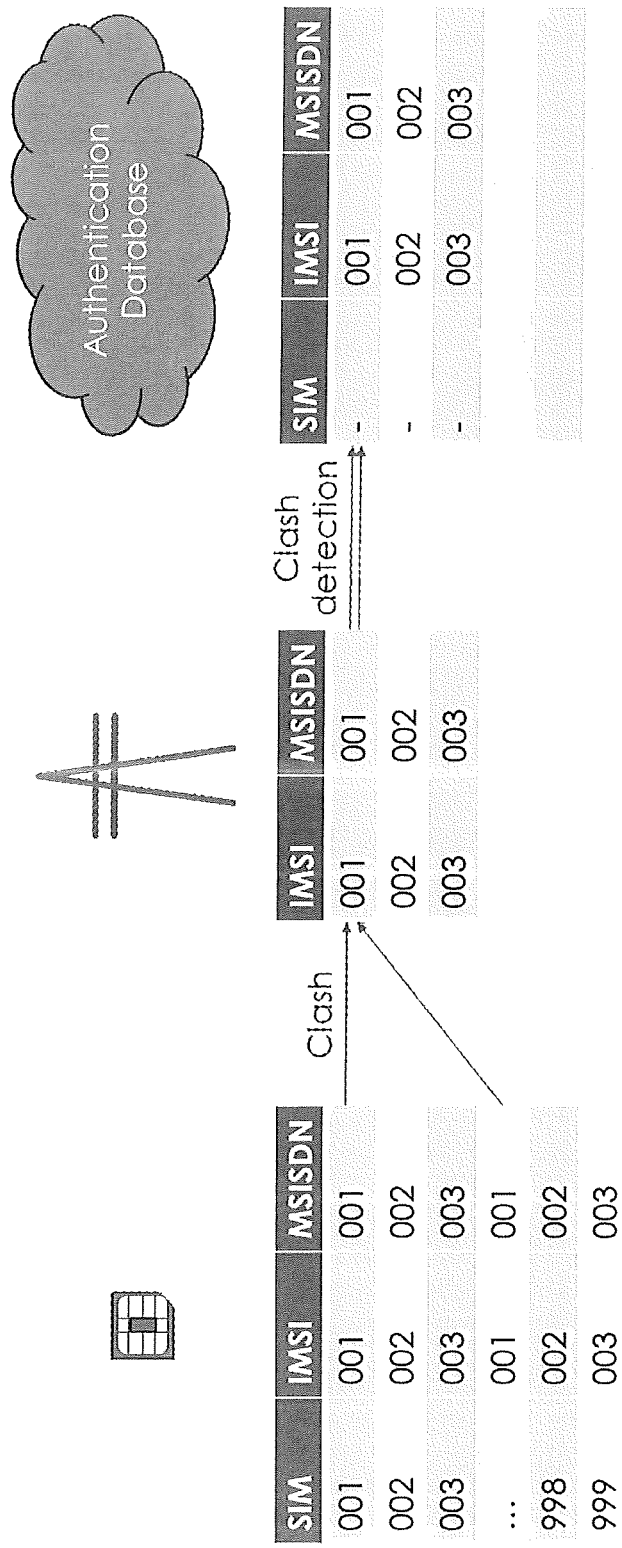
FIG. 3 shows a schematic of system illustrating the concept of clash detection.

FIG. 3 is a schematic diagram illustrating the principle of clash detection. Region 301 of the figure depicts a plurality of SIMs 001, 002 . . . 999 which are provided with the above algorithm which, in this simplified example the generated IMSI and MSISDN pairs have values from 001 to 003. In the particular example of FIG. 3, two SIMs both send an authentication request to the network 303 using the IMSI/

MSISDN pair 001, 001. When two SIMs with the same identity are detected on the network and these identities are recognised by the network 303, the authentication database 305 then validates both requests using the standard authentication protocol described with reference to FIG. 1 to ensure that both of the requests are authentication requests from non-fraudulent devices.

Figure 4:
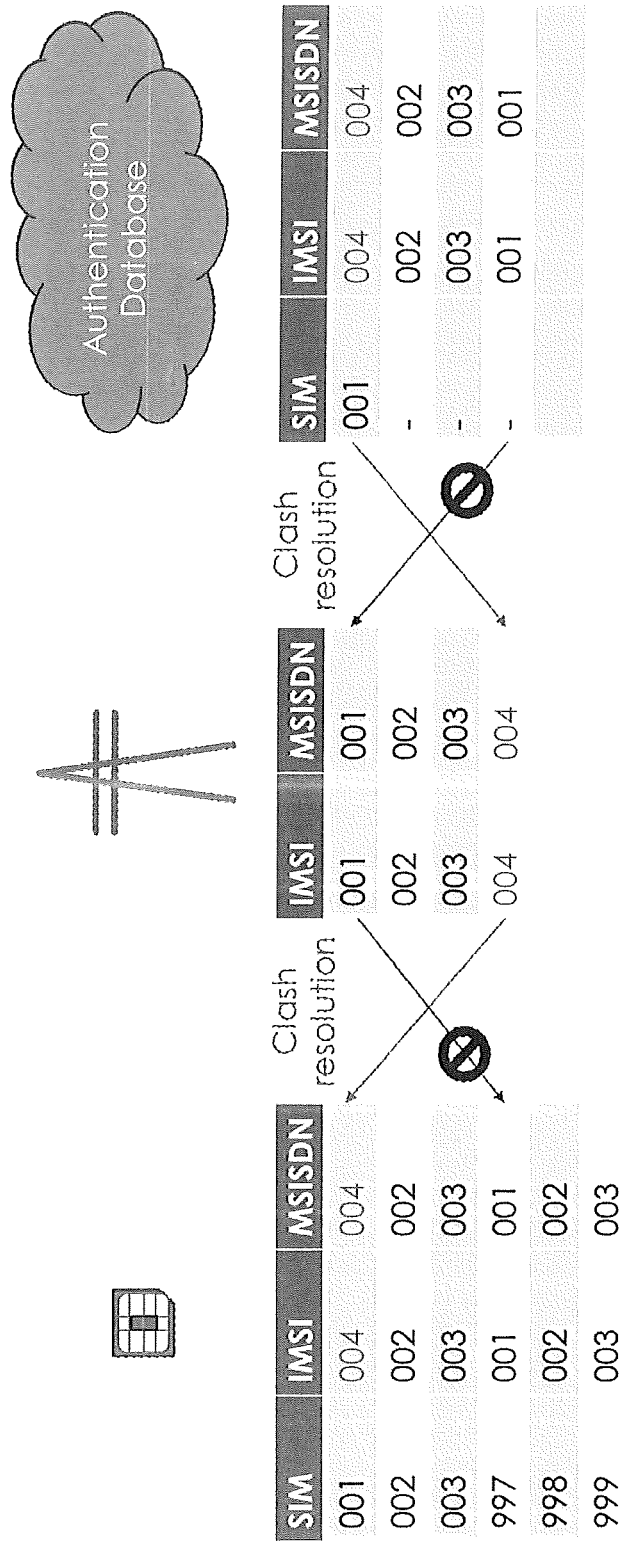
FIG. 4 shows a schematic of a system illustrating the concept of clash resolution.

Once the first ID has been authenticated, the authentication centre instructs the download of a new ID (IMSI/MSISDN pair) to the SIM. This is shown in FIG. 4, the same reference numerals denote the same features as those of FIG. 3. In FIG. 4, authentication of SIM 001 is successful and the traffic ID, which in this case is shown as IMSI/MSISDN pair 004/004 is downloaded to the SIM 001 using, for example, OTA. This new ID is supplied to the network to allow the SIM to then allow the device in which it is housed to communicate over the network 303.

However, the authentication centre will reject authentication of another other valid request with the same IMSI or IMSI/MSISDM pair. This may optionally involve sending a message requesting more time for the authentication process. The process continues as described further below, until eventually all the authentication requests are provided with valid traffic identities.

As described above, as the same identity (IMSI) is replicated and re-used by multiple SIMs, it can cause authentication failure at the network. This is explained in more detail later. It is possible that some network infrastructures, in particular the HLR/VLR, may result multiple authentication requests which could give the appearance of a SIM activation process. However such "secondary requests" may be identified as duplicates and the authentication centre may then be instructed to reject these.

Figure 5:
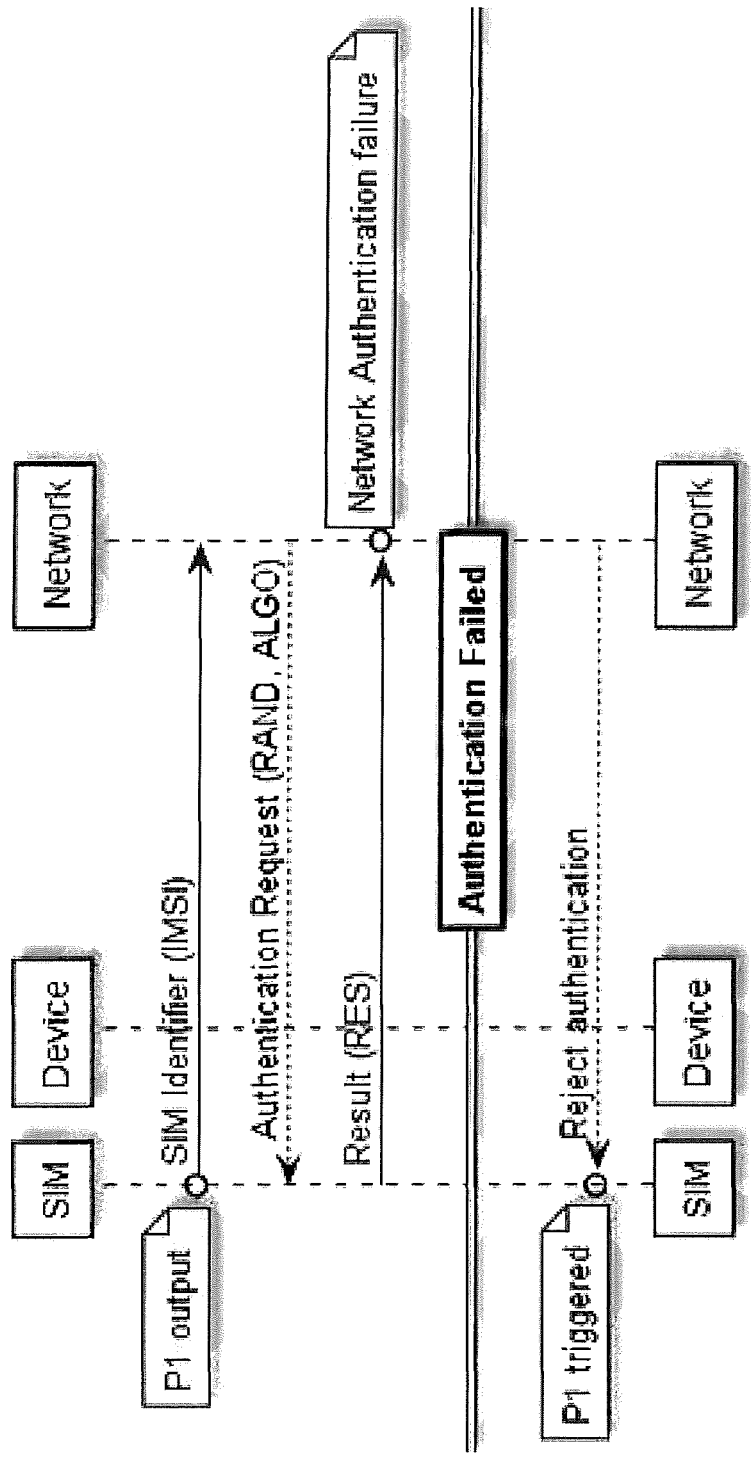
FIG. 5 shows a schematic of the process flow of an authentication procedure where a clash has been detected.

FIG. 5 shows a process flow where a second identical ID is received at the network. The process is the same as that described in relation to FIG. 1 up to step S105. However, at this stage, the authentication fails because the ID has been previously processed. In this situation, when the SIM receives a message from the network indicating that the authentication has failed, the SIM starts process P1, which runs at the SIM.

Figure 6:
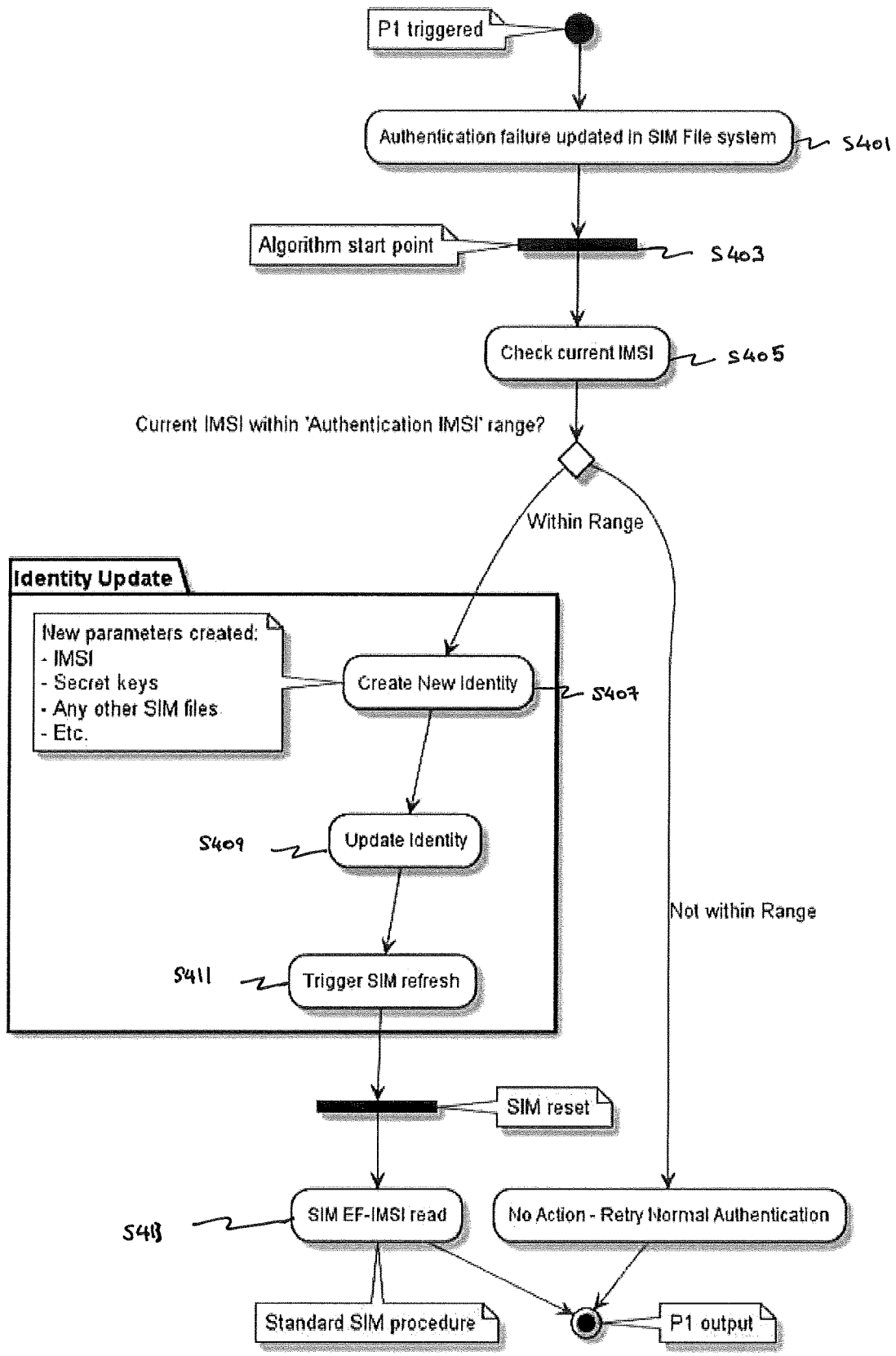
FIG. 6 shows a flow diagram showing the regeneration of a new ID where a clash has been detected.

FIG. 6 shows an example of process P1. In step S401, the SIM file system updates to indicate that there has been an authentication failure this then starts the algorithm at step S403. The algorithm functions to select a new ID from a sequence as described below. In step S405, the current IMSI (i.e. the one that has been rejected) is checked to see if it is within range. The algorithm needs to preserve a certain range of IMSIs to be used purely for such recyclable-authentication purposes. Therefore the range is defined by boundaries such as IMSI Start and IMSI End. The IMSIs that fall out of such a range will not be processed by the algorithm within the SIM.

If the current IMSI is within range, then the algorithm starts with a first step of creating a new identity in step S407. Here, the new parameters are created, such as the IMSI, secret keys, and other SIM data. The IMSI is created from the previous IMSI as the algorithm is configured to generate the IMSI from a sequence as opposed to retrieving a stored IMSI. In one embodiment, the IMSIs that can be generated by the SIM are one digit apart, e.g. 1, 2 . . . 10 and the next IMSI is generated by adding a "1" to the previous IMSI (i.e. incrementing the least significant digit of the previous IMSI). However, there is no requirement for the IMSIs generate in the sequence to follow such an order, the following IMSI could be generated by incrementing or decrementing the previous IMSI by a set amount. In a further embodiment, the IMSIs will be within a fixed range and there will be a fixed increment/decrement between IMSIs, however, which IMSI will be generated next in the sequence is chosen at random. Thus, for example, when the algorithm is run on two SIMs at the same time, there is a greater probability of the two SIMs generating different IMSIs and therefore avoiding a clash. That is, an IMSI can be created from the previous IMSI by incrementing or decrementing the least significant digit of the previous IMSI by an amount which is chosen at random.

During the Identity creation process, an authentication IMSI is generated, which in turn requires that the secret keys for authentication purposes will either need to be the same for all these IMSIs, or will need to be updated to be unique to each IMSI.

In an embodiment, unique combinations of these keys are used for security purposes. In an embodiment, the key pairs are generated in real time. Generating the key pairs in real-time has the advantage that there is no need to provide additional memory on the SIM to save pre-generated pairs. Also, there is no need to provide additional storage capacity on the network to store pre-generated pairs (keys may be generated on the network side once a match has been found in the database).

Figure 7:
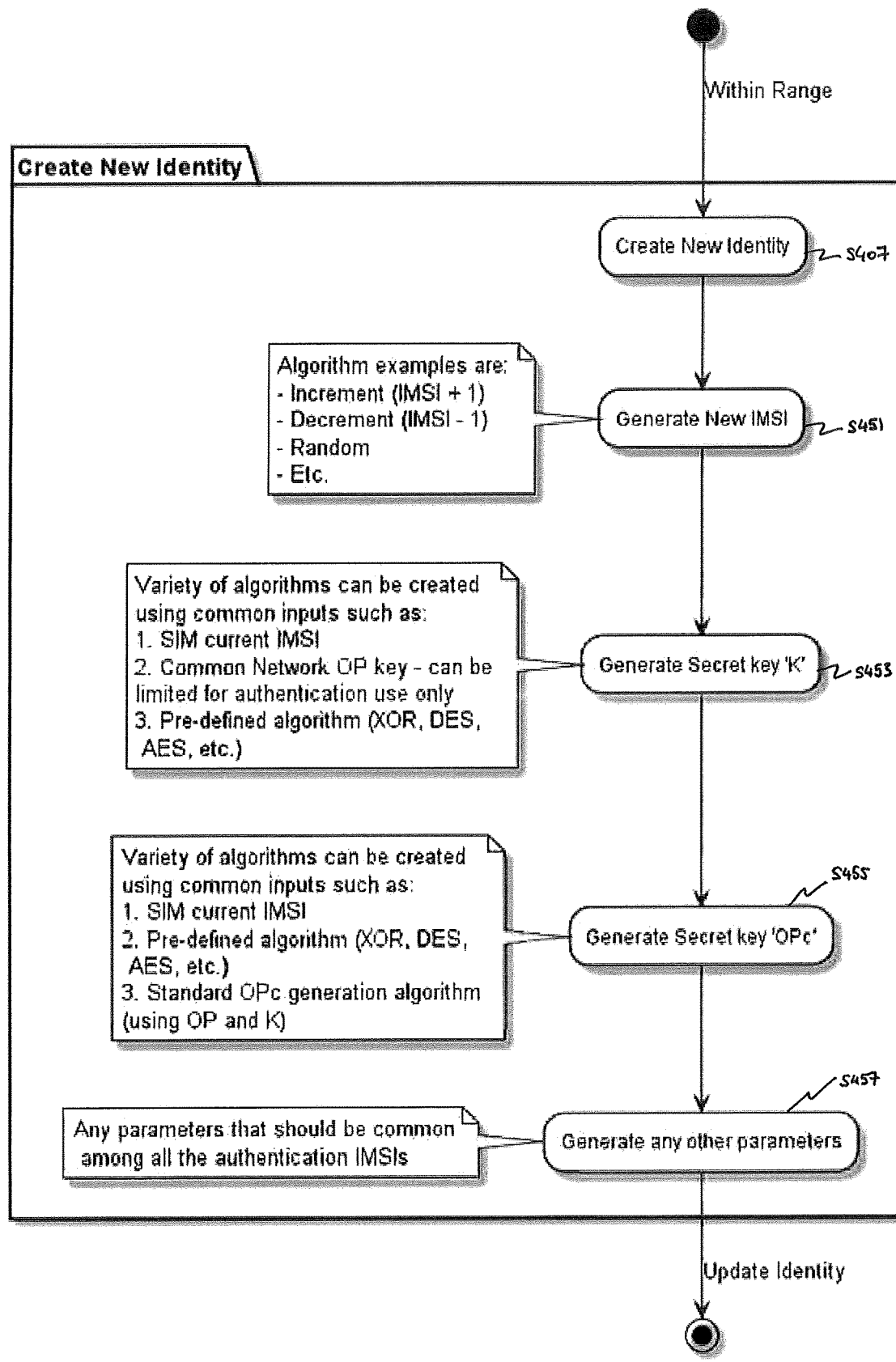
FIG. 7 shows a flow diagram showing the creation of the new keys in the process of FIG. 6.

FIG. 7 shows how the key pairs may be generated in real time. The process starts in step S407. In step S451, a new IMSI is generated as described above. Possible examples of the algorithm which may be used to generate the IMSI are to increment the IMSI, decrement the IMSI by one or some other agreed value or, as indicated above select the next IMSI randomly from a sequence of IMSIs.

Next, in step S453, the secret key is generated. It should be noted, that this secret key K, as it is shared between the SIM and the network is preferably generated at both the device and the network. There are a variety of algorithms that may be employed, for example a key may be created using common inputs such as the current IMSI or the common network "OP" Key (defined in the LTE security architecture; this may only be useful for limited authentication); example cryptographic algorithms include the XOR function, DES (Data Encryption Standard), AES (Advanced Encryption Standard), and so forth.

In step S455, a secret key OPc is generated. This key may be used, for example in the 3GPP MILENAGE algorithm to generate an IK key (see above in relation to FIG. 1). The OPc key may be generated using a standard algorithm which uses both the OP and K as an input. Again a variety of algorithms can be created using common inputs as previously described. Finally, in step S457, there are generated any other parameters which in the particular operating environment should preferably be common to all of the authentication IMSIs.

Returning again to FIG. 6, once the new identity has been created, the processor on the SIM is adapted to update the identity in line with the newly generated identity at step S409. Next, a SIM refresh operation is triggered in step S411. This then serves to reset the SIM with the new identity. In step S413, the SIM receives an elementary file IMSI read procedure from the device. This concludes the P1 algorithm.

If, in step S405, the current IMSI is not within the authentication range (i.e. there has been a failure to authenticate a "real" traffic IMSI), then there is no attempt to update the IMSI and normal authentication is re-tried.

Figure 8:
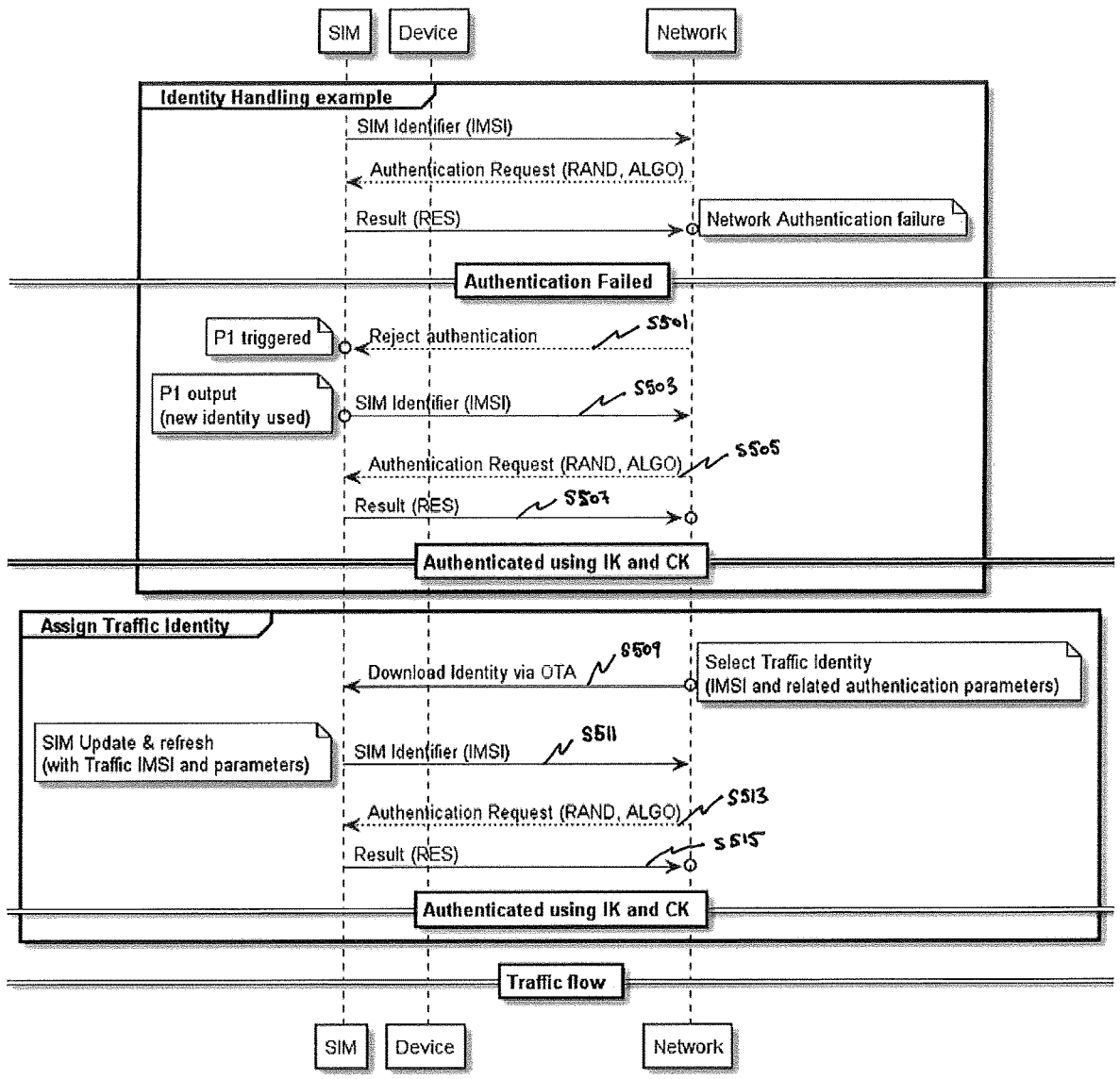
FIG. 8 shows a schematic of a process flow showing SIM activation and traffic communication according to an embodiment of the present invention.

FIG. 8 shows an authentication flow similar to that described with reference to FIG. 1 but expanded to incorporate algorithm P1: As explained above with reference to FIGS. 3 and 4, the authentication is rejected in step S501 due to the duplication of the ID from two SIMs. Algorithm P1 is then triggered as explained with reference to FIGS. 6 and 7. The output of the algorithm is then provided from the SIM through the device to the network in step S503. Again, the authentication process starts and, for example, a random number is sent to the SIM from the network in step S505 and the result is returned from the SIM in step S507. This is compared with the network generated result.

If no clash has been detected, then the authentication proceeds and in the next step (in this example) the traffic identity is assigned using the IK and CK generated during authentication. Once the SIM is authenticated to the network via the above mechanism, a traffic IMSI is created/selected by the network. This traffic IMSI can then be downloaded to the SIM, in embodiments via standardized OTA mechanisms, for example using SMS, USSD or BIP channels in step S509. The SIM then refreshes the relevant parameters stored in its file system and will thereafter use the traffic IMSI—following the standard SIM authentication and lifecycle.

Once the traffic IMSI has been used to update the SIM, the authentication process proceeds once more, this time with the SIM sending the traffic IMSI to the network in step S511. Again a random number is sent back to the device in step S513, and finally, the result from the device is sent to the network in step S515. After this process, the device in collaboration with the SIM will use the traffic IMSI for all communication from then on.

We now refer back to the authentication IMSI generation performed at step S451.

The inventors have identified that in embodiments whereby the generation of new IMSIs is implemented by simple a increment or decrement of the least significant digit of the previous IMSI, assuming there are multiple SIMs authenticating and at one point in time one of them is found to have a clash, when using an incrementing/decrementing function, this can lead to clashing IMSIs on an exponential level, this is shown in the table below.

| SIMs | IMSI | IMSI after increment | IMSI after increment |
|---|---|---|---|
| SIM1 | XXXYY9876543210 (!) | XXXYY9876543211 (!) | XXXYY9876543212 (!) |
| SIM2 | XXXYY9876543211 | XXXYY9876543211 (!) | XXXYY9876543212 (!) |
| SIM3 | XXXYY9876543212 | XXXYY9876543212 | XXXYY9876543212 (!) |
|  | Phase 1 | Phase 2 | Phase 3 |

In phase 1, SIM1 attempts authentication (using IMSI XXXYY9876543210) but the authentication fails because XXXYY9876543210 is being used to activate another SIM e.g. SIMA (not shown in table). SIM1 then increments its IMSI to XXXYY9876543211.

In phase 2, SIM1 attempts authentication (using the incremented IMSI XXXYY9876543211) but authentication causes a clash because XXXYY9876543211 is being simultaneously used to activate another SIM (SIM2). SIM2 attempts authentication (using its IMSI XXXYY9876543211) but authentication causes a clash because XXXYY9876543211 is being used to activate another SIM (SIM1). SIM1 increments its IMSI to XXXYY9876543212 and SIM2 increments its IMSI to XXXYY9876543212.

The above leads to a situation where multiple SIMs will be attempting authentication using the same IMSI (see phase 3).

In the event that XXXYY9876543212 is being used to activate SIM3, the attempted authentication by SIM1 and SIM2 using XXXYY9876543212 causes a clash and the SIMs would need to increment their (same) IMSI for use in another authentication attempt.

During any clash, only one IMSI would be used for communication to download a permanent IMSI. This would take some time and in this time, the network unavailability for the other SIMs would cause the SIMs incrementing quickly to a point where there are many SIMs attempting a network connection with the same IMSI.

This causes (i) network congestion to cater to authentication requests from so many SIMs with the same IMSI (and confusion in the roaming networks); and (ii) major time taken to provide permanent IMSIs to the SIMs as they are all in a situation where they are using the same IMSI and therefore cannot be simultaneously served.

To avoid such a situation, a pseudorandom number generator is used during manufacture of the SIMs to assign each with a random number to be used as part of the SIM's IMSI. This combined with an algorithm to generate a new IMSI in the event, of a failed authentication will reduce the probability of clashes.

It is possible to fix a further $6^{th}$ digit to a standard IMSI and using the range of 9 remaining numbers to create 999,999,999 IMSIs that could be in circulation.

So the IMSI definition would look like: YYY ZZ N XXXXXXXXX where,
YYY=Mobile Country Code (MCC)
ZZ=Mobile Network Code (MNC)
N=The new digit indicative of the range of IMSIs being used for random generation purposes. For example, the digit N could be set to 0 to indicate an authentication identifier and any other number to indicate a traffic identifier.
XXXXXXXXX=Random number used in generation of IMSIs.

In this case, using pseudorandom number generators the SIMs during production would be diversified to create a random 9 digit versions of XXXXXXXXX. Then an algorithm can generate a next number that is less likely to clash with the set of random IMSI SIMs that are in production.

The algorithm takes as an input an IMSI which resulted in authentication failure and gives as an output a new IMSI for use in another activation request.

The generation of a new IMSI should cause the SIM to have a unique IMSI which should have less chances of clashing with an IMSI that is in a manufacturing state. In order for this to happen, the IMSIs are divided into pools whereby each pool represents the number of times an algorithm was used. Therefore:
Pool 1: State of IMSIs at manufacturing
Pool 2: State of IMSIs after $1^{st}$ use of algorithm
Pool 3: State of IMSIs after $2^{nd}$ use of algorithm
. . . and so on.

Each pool comprises a plurality of unique IMSIs. That is, each IMSI is assigned to only a single pool.

If for example there are 10 pools of IMSIs, it means that the algorithm has to cycle through 10 iterations before producing an IMSI that will likely have a clash with another SIM.

Incrementing can be a logic used to create 10 pools of IMSIs—however this is not by incrementing the last digit, but indeed the $7^{th}$ digit, i.e. YYYZZNAXXXXXXXX where A (a pool identifier digit) represents the digit that would be incremented. So the A digit can be assigned as 0 at the state of manufacturing and can be incremented with each iteration of the algorithm thereby creating a set of IMSIs unique in each time (until 10 iterations). This approach however limits the range of random number generation for IMSIs to 8 digits instead of 9 since a digit has been reserved for the algorithm.

In another approach, each number in a pool is either a prime number or is created based on a multiplication using a prime number. The multiplication using a prime number may comprise one of (i) multiplying a prime number by itself; (ii) multiplying a prime number with a multiple of a prime number; and (iii) multiplying a prime number with another prime number.

For example, the IMSIs could be assigned to pools as shown below:

Pool 1 (prime numbers): 002, 003, 005, 007 . . . .
Pool 2 (prime numbers multiplied by itself): 004, 009, 025, 049 . . . .
Pool 3 (pool 2 result multiplied by its square root): 008, 027, 125, 343 . . . .
Pool 4 (prime numbers multiplied by the next higher prime in sequence): 006, 015, 035, 077 . . . .

In this way, each pool would be a set of unique numbers. That is, each IMSI is assigned to only a single pool. As will be apparent, all of the numbers that have been generated between 000 to 009 belong to different pools and can be uniquely placed in each pool. It will be appreciated that the above assignment of IMSIs to pools is merely an example to illustrate the concept.

The algorithm is fixed, and the inputs of the algorithm are variable. So using the prime number example above—the algorithm would simply take the original prime as an input and generate a sequence of IMSIs with each IMSI being in different pools (in the event of failed authentications).

In the prime number example above, a SIM with an IMSI of 002 would, in the event of failed authentications, generate IMSIs 004, 008, 006 with the algorithm being used 3 times. The algorithm itself in this example is a definition that is "Pool 2 is a product of multiplying the pool 1 number by itself, Pool 3 is a product of multiplying the pool 2 result with its square root (the original pool 1 number), Pool 4 is a product of multiplying the original prime number (the original pool 1 number) with the next higher prime in the sequence of prime numbers".

Since the algorithm is known, by having knowledge of the IMSI which resulted in authentication failure and the pool this IMSI comes from, it is possible to derive a new IMSI from the next pool (the algorithm knows what calculation is to be performed based on this information). The calculation performed by the algorithm to determine the new IMSI may use the IMSI which resulted in authentication failure or an original IMSI assigned to the SIM at manufacture. It will be appreciated in some scenarios the IMSI which resulted in authentication failure may be the original IMSI assigned to the SIM at manufacture.

Preferably, the IMSIs are assigned to at least four pools.

It will be apparent that the above described algorithm functionality avoids the clashing of IMSIs on an exponential level.

This above described techniques may be enhanced by using location information associated with the SIM to create silos of IMSIs to easily identify traffic and limit impact of clash of IMSIs to particular regions. In particular, the algorithm takes as an input an IMSI which resulted in authentication failure and as an additional input the location information to give as an output a new IMSI for use in another activation request.

As one of the definitions of the algorithm for generating a pool, it is possible to use the location of the SIM e.g. using cell ID, network ID, country code (MCC), location area code (LAC)). Those IMSI values would be reserved from use in other algorithm definitions. E.g. if the MCC is used, then values from 001 to 999 (MCC range) would be reserved for use by the "location algorithm pool definition". So a given XXXXXXXXX number could then by multiplied by the MCC and resultant value would still be in a unique pool but differentiated using location information. If it is desirable to differentiate the IMSIs in use by country, a pool of IMSIs with an MCC identifier (001 to 999) can be set aside. This will ensure that if clashes are happening in one country, they don't affect the other country as their ranges are markedly different.

The algorithm may also make use of the timestamps of the SIMs authentication requests to create new IMSIs. In particular, the algorithm takes as an input an IMSI which resulted in authentication failure and as an additional input a timestamp of the failed authentication request from the SIM to the network, to give as an output a new IMSI for use in another activation request. If the network rejects any IMSI, the SIM can then use that timestamp for generation of a new IMSI. The network, knowing the timestamp as well, would be able to then generate the new IMSI in the network as well and prepare for authentication request. This advantageously introduces randomness to the IMSI generation which is a result of the exact time of authentication which has resulting security benefits (to prevent ability to predict the right IMSIs for a given SIM).

The above system/procedure allows multiple SIMs to be deployed in a device—for example in cases where it is not sure whether one or more of the SIMs will be ever used or, if they are used, when they will be used. For example, for a given IMSI range: XXXYY0000000000-XXXYY0000999999 of a batch of 1 million SIMs, a range of 10,000 'Authentication IMSIs' as XXXYY0000000000-XXXYY0000009999 may be used, with a consequent reduction in data storage (of relevant data) by a factor of two orders of magnitude: Assuming that the ranges are distributed equally to the SIMs during manufacturing, at T0 the same authentication IMSI may be personalized/re-used by 100 SIMs (1,000,000/10,000=100). This means, that it is only necessary to put in place the infrastructure for handling 10,000 IDs initially as opposed to the 1 million IDs if one ID corresponded to one SIM card.

When Internet enabled devices are sold, it is often not clear whether the user will ever wish to use the Internet enabled functionality or when they might wish to use that functionality. For example, referring to the taxi meter example mentioned in the introduction, the meter may work perfectly well in a taxi without connection to any outside source. However, some taxi drivers or some taxi companies may desire communication between the taxi meter and some central location. To provide a valid traffic ID every taximeter would require a fairly large infrastructure. This would be justified if all taxi meters used their connectivity immediately but in practice many of the taximeters, particularly at the start, might not require this function. The technology we have described allows all of the taxi meters to be provided with the ability to connect, but only needs to put in place the infrastructure for a fraction, for example $\frac{1}{100}$, of them to connect immediately. Moreover it is not necessary to know which of the meters will connect first as each meter will have access to the full range of IMSIs.

Another benefit of an embodiment of the invention is increased speed of operation of the network: As well as the additional infrastructure needed, the additional memory space required would in turn slow down the system because larger databases would need to be accessed in order to search for the correct matches.

There is also a cost saving as compared with a case in which each additional meter needed to connect to the network. Still further, even if all of the meters were to eventually use their connectivity, there would still be no need to put the full infrastructure in place immediately. In some complex connected products, for example, connected cars, the SIMs may be provided to the car distributors a very long time before a car is available for purchase and may possibly remain unused a very long time after a car is sold.

Some of the benefits of embodiments of the invention have been discussed using the example of a taxi meter but it will be appreciated that similar advantages can be provided in many other applications.

Thus, embodiments of the above method allow the distribution of a massive number of IoT devices without needing to provision the same number of IMSIs in the network. Thus the technology we describe can significantly reduce both the upfront and recurring cost because IoT businesses only have to pay for the active SIM cards and the cost will be proportional to the revenue. The technology also streamlines the acquisition and management of new traffic identities. This is because since identities are broken down into authentication and traffic identities, authentication identities are available in advance.

The above described technology also has a clear advantage for security of the connected devices since the traffic IDs are only transmitted after authentication of the authentication IDs. This is a more secure process because the network registration data is not passed from the manufacturer to the network operator.

Many variations and extensions are possible. For example the skilled person will appreciate that if all of the generated SIM IDs are eventually used, it is nonetheless possible to allow further devices to connect, for example by updating these devices (more particularly their SIMs). In embodiments this may comprise providing a SIM with additional data (such as an updated definition of the set of first SIM identifiers, for example a new lower and/or upper bound to a range defining the set) and/or with a new or updated algorithm (update processor control code) to allows the SIM to generate a different sequence of IMSIs.

Further aspects of the invention are defined in the following clauses:

1. A system for activating SIMs, wherein the system comprises more SIMs than will be authorised for use on a mobile network, the system comprising:
   a plurality of SIMs, each of said SIMs being configured to provide a first SIM identifier,
   wherein one or more said first SIM identifiers is reused amongst said plurality of SIMs such that one of said plurality of SIMs may provide the same said SIM identifier as another of said plurality of SIMs; and
   a SIM authorisation server, configured to receive said first SIM identifier from a SIM requesting activation and, in response, to provide a new SIM identifier to said SIM requesting activation,
   wherein said new SIM identifier enables said SIM requesting activation to communicate traffic over said mobile network.

2. A system according to clause 1 wherein said first SIM identifier and said new SIM identifier each comprise an IMSI.

3. A system according to clause 1 or 2 wherein said first SIM identifiers of said plurality of SIMs have values within a defined set of values, and wherein said new SIM identifier is not within said defined set of values.

4. A system according to clause 3 wherein said SIM requesting activation is configured to request activation by initiating an authentication request with said mobile network using said first SIM identifier.

5. A system according to any preceding clause wherein, in response to failure of a request for activation comprising said first SIM identifier, said SIM requesting activation is configured to provide a different said first SIM identifier for said SIM authorisation server.

6. A system according to any preceding clause wherein said SIM requesting activation is configured to determine whether, in response to failure of a request for activation by one of said plurality of SIMs, an identifier used for said request for activation was said first SIM identifier or said new SIM identifier, and to provide a different said first SIM identifier when said identifier used for said request for activation was said first SIM identifier.

7. A system according to any preceding clause wherein each of said SIM cards has an associated computer readable storage medium storing processor control code to generate a plurality of said first SIM identifiers from within a defined set of values.

8. A SIM for use in a system for activating SIMs, wherein the system comprises more SIMs than will be authorised for use on a mobile network, the SIM having an associated computer readable storage medium storing processor control code to:
   generate a first SIM identifier for activation of the SIM, wherein said generated first SIM identifier has a value from within a defined set of values; and
   update said first SIM identifier with a new SIM identifier received from a SIM authorisation server after activation of the SIM.

9. A SIM according to clause 8 wherein said first SIM identifier and said new SIM identifier each comprise an IMSI.

10. A SIM according to clause 8 or 9 wherein said processor control code is further configured to generate a succession of said first SIM identifiers from within a defined set of values, wherein a second said first SIM identifier is generated in response to failure of a request for authentication of said SIM with a mobile network with an initial said first SIM identifier.

11. A connected device including a SIM according to clause 8, 9 or 10.

12. A SIM authorisation server for use a system for activating SIMs, wherein the system comprises more SIMs than will be authorised for use on a mobile network, the SIM authorisation server comprising a computer readable storage medium storing processor control code to receive a first SIM identifier from a SIM requesting activation and, in response, provide a new SIM identifier to said SIM requesting activation,
   wherein said first SIM identifier is from a set of first SIM identifiers smaller than a number of SIMs that may request activation such that two of said SIMs requesting activation may provide the same said first SIM identifier,
   wherein said new SIM identifier is not within said set of possible first SIM identifiers, and wherein said new SIM identifier is authenticatable by the mobile network to enable said SIM requesting activation to communicate traffic over a mobile network.

13. A method of activating a connected a device such that the device is able to communicate traffic over a mobile network, the method comprising:
using a device with a SIM, wherein said SIM is configured to provide a first SIM identifier selected from a set of possible first SIM identifiers;
sending an activation request with said first SIM identifier from said device to a mobile network;
receiving a response to said activation request;
when said response includes a new SIM identifier, activating said device such that the device is able to communicate traffic over a mobile network, wherein said activating comprises updating said SIM with said new SIM identifier; and
choosing a different first SIM identifier from said set of possible first SIM identifiers if said activating of said device has not taken place.

14. A method according to clause 13 wherein said first SIM identifier and said new SIM identifier each comprise an IMSI.

15A. A method according to clause 13 or 14, for activating a plurality of connected devices, wherein there are more of said connected devices than available first SIM identifiers, the method comprising:
using a plurality of said connected devices each with a respective said SIM;
activating one of said connected devices by receiving said new SIM identifier;
detecting when a first SIM identifier of a subsequent connected device requesting activation conflicts with the first SIM identifier of a previously activated connected device; and
resolving the detected conflict by determining a different first SIM identifier for said subsequent connected device.

15B. A computer program product storing processor control code to implement the method of any one of clauses 13 to 15A.

16. A device with an associated SIM comprising a processor, said processor being adapted to generate an identity from a sequence of known identities, the device being adapted to transmit said identity to a network.

17. The device with an associated SIM of clause 16, wherein said processor is further adapted to transmit an authentication request to a network, and upon receiving a rejection of the authentication request, to generate a further identity from the sequence of known identities.

18. A device with an associated SIM according to clause 16 or 17, wherein each of said sequence of known identities has a known relationship to at least one other of said identities.

19. A device with an associated SIM according to clause 18, wherein there is a known start point and end point for said sequence of identities.

20. A device with an associated SIM according to any one of clauses 16 to 19, wherein the storage requirements for generating the sequence of numbers is less than for the amount of storage required if the entire sequence was stored as individual numbers.

21. A device with an associated SIM according to clause 16, wherein the processor is adapted to generate a key from said generated identity.

22. A device with an associated SIM according to clause 21, wherein said keys are generated from a network shared key and the current identity.

23. A device with an associated SIM according to any one of clauses 16 to 22, wherein the identity is an IMSI.

24. A device with an associated SIM according to any of clauses 16 to 22, wherein the identity is an IMSI-MSISDN pair.

25. A device with an associated SIM according to any of clauses 16 to 24, wherein the device is adapted to transmit an authentication request to a network and to receive a new identifier which is not part of the said sequence from the network once said authentication request has been accepted.

26. A device with an associated SIM according to clause 25, wherein the device is adapted to use said new identifier as the identifier of the device.

27. A device with an associated SIM according to any of clauses 16 to 26, wherein said SIM comprises a SIM card and wherein said processor is provided on said SIM card.

28. A SIM authorisation server comprising a database, a processor and a communication interface for communicating with a device, wherein said server is adapted to:
receive an authentication request comprising an identifier from a device;
match said identifier in said database to retrieve a key, wherein said key is generated once a match with said identifier has been determined; and
authenticate said device using said identifier and said key.

29. A server comprising a database, a processor and a communication interface for communicating with a device, wherein said server is adapted to:
receive an authentication request comprising an identifier from a first device;
receive an authentication request comprising the said identifier from a second device;
match said identifier in said database to retrieve a key;
perform an authentication procedure with said first and second devices using said identifier and said key;
accept the authentication of said first device and transmit a new identifier to the said first device to use for further communications with the network; and
and reject the authentication of said second device.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:
1. A system for activating SIMs, wherein the system comprises more SIMs than will be authorised for use on a mobile network, the system comprising:
a plurality of SIMs, each of said SIMs being configured to provide an authentication identifier,
wherein one or more said authentication identifiers is reused amongst said plurality of SIMs such that one of said plurality of SIMs may provide the same said authentication identifier as another of said plurality of SIMs wherein said authentication identifiers of said plurality of SIMs have values within a defined set of values; and
a SIM authorisation server, configured to receive a said authentication identifier from a SIM requesting activation, determine whether said authentication identifier has been used to activate a SIM and, in response to a successful activation, to provide a traffic identifier to said SIM requesting activation and wherein said traffic identifier is not within said defined set of values, wherein said traffic identifier enables said SIM requesting activation to communicate traffic over said mobile network; and wherein, in response to failure of said activation said SIM requesting activation is configured to provide a different authentication identifier to said SIM authorisation server from the defined set of values, wherein said different authentication identifier is generated based on at least the said authentication identifier previously transmitted to the SIM authorisation server.

2. The system as claimed in claim 1, wherein said authentication identifier and said traffic identifier each comprise an International Mobile Subscriber Identify (IMSI).

3. The system as claimed in claim 1, wherein said SIM requesting activation is configured to request activation by initiating an authentication request with said mobile network using said authentication identifier.

4. The system as claimed in claim 1, wherein said different authentication identifier is generated by incrementing or decrementing, by a set amount, a least significant digit of said authentication identifier previously transmitted to the SIM authorisation server.

5. The system as claimed claim 1, wherein said different authentication identifier is generated by incrementing or decrementing, by an amount chosen at random, a least significant digit of said authentication identifier previously transmitted to the SIM authorisation server.

6. The system as claimed in claim 1, wherein said authentication identifier is assigned to a pool of authentication identifiers, said pool being one of a plurality of pools of authentication identifiers and each pool comprising a set of unique authentication identifiers, and further wherein said different authentication identifier is assigned to a further pool of the plurality of pools.

7. The system as claimed in claim 6, wherein said authentication identifier comprises a pool identifier digit and a plurality of lower-order digits randomly assigned to the SIM requesting activation at manufacture, and said different authentication identifier is generated by incrementing or decrementing said pool identifier digit.

8. The system as claimed in claim 6, wherein each authentication identifier in pool of the plurality of pools of authentication identifiers is either a prime number or can be created based on a multiplication using a prime number.

9. The system as claimed in claim 1, wherein said different authentication identifier is generated based on a location of the SIM requesting activation.

10. The system as claimed in claim 1, wherein said different authentication identifier is generated based on a timestamp of a transmission of said authentication identifier to the SIM authorisation server.

11. The system as claimed in claim 1, wherein said SIM requesting activation is configured to determine whether, in response to failure of a request for activation by one of said plurality of SIMs, an identifier used for said request for activation was a said authentication identifier or said traffic identifier, and to provide a different authentication identifier when said identifier used for said request for activation was a said authentication identifier.

12. The system as claimed in claim 1, wherein each of said SIM cards has an associated computer readable storage medium storing processor control code to generate a plurality of said authentication identifiers from within the defined set of values.

13. A SIM for use in a system for activating SIMs, wherein the system comprises more SIMs than will be authorised for use on a mobile network, the SIM having an associated computer readable storage medium storing processor control code to: generate an authentication identifier for activation of the SIM, wherein said generated authentication identifier has a value from within a defined set of values; send an activation request with said authentication identifier to a SIM authorisation server in the mobile network;

update said authentication identifier with a traffic identifier received from the SIM authorisation server after successful activation of the SIM; and in response to a failed activation of the SIM, generate a different authentication identifier from the defined set of values, wherein the different authentication identifier is generated based on the authentication identifier previously sent to the SIM authorisation server, and provide the different authentication identifier to said SIM authorisation server.

14. The SIM as claimed in claim 13, wherein said authentication identifier and said traffic identifier each comprise an International Mobile Subscriber Identity (IMSI).

15. A connected device with a SIM for use in a system for activating SIMs, wherein the system comprises more SIMs than will be authorised for use on a mobile network, the SIM having an associated computer readable storage medium storing processor control code to: generate an authentication identifier for activation of the SIM, wherein said generated authentication identifier has a value from within a defined set of values; send an activation request with said authentication identifier to a SIM authorisation server in the mobile network;

update said authentication identifier with a traffic identifier received from the SIM authorisation server after successful activation of the SIM; and in response to a failed activation of the SIM, generate a different authentication identifier from the defined set of values, wherein the different authentication identifier is generated based on the authentication identifier previously sent to the SIM authorisation server, and provide the different authentication identifier to said SIM authorisation server.

16. A SIM authorisation server for use in a system for activating SIMs, wherein the system comprises more SIMs than will be authorised for use on a mobile network, the SIM authorisation server comprising a computer readable storage medium storing processor control code to receive a first SIM identifier from a SIM requesting activation and, in response, provide a new SIM identifier to said SIM requesting activation, wherein said first SIM identifier is from a set of first SIM identifiers smaller than a number of SIMs that may request activation such that two of said SIMs requesting activation may provide the same said first SIM identifier, wherein said new SIM identifier is not within said set of possible first SIM identifiers, and wherein said new SIM identifier is authenticatable by the mobile network to enable said SIM requesting activation to communicate traffic over the mobile network.

17. A method of activating a connected device such that the device is able to communicate traffic over a mobile network, the method comprising:

using the connected device with a SIM, wherein said SIM is configured to provide an authentication identifier selected from a set of possible authentication identifiers;

sending an activation request with said authentication identifier from said device to a SIM authorisation server in the mobile network;

receiving a response to said activation request from the SIM authorisation server;

when said response includes a traffic identifier in response to a successful activation, activating said device such that the device is able to communicate traffic over a mobile network, wherein said activating comprises updating said SIM with said traffic identifier, wherein said traffic identifier is not within said set of possible authentication identifiers; and choosing a different authentication identifier from said set of possible authentication identifiers if said activating of said device has not taken place, wherein the different said authentication identifier is generated based on the authentication identifier previously transmitted to the SIM authorisation server, and providing the different authentication identifier to the SIM authorisation server.

18. The method as claimed in claim 17, wherein said authentication identifier and said traffic identifier each comprise an International Mobile Subscriber Identity (IMSI).

19. The method as claimed in claim 17, for activating a plurality of connected devices, wherein there are more of said connected devices than available authentication identifiers, the method comprising:

using a plurality of said connected devices each with a respective said SIM; activating one of said connected devices by receiving said new SIM identifier; detecting when an authentication identifier of a subsequent connected device requesting activation conflicts with the first SIM identifier of a previously activated connected device; and resolving the detected conflict by determining a different authentication identifier for said subsequent connected device.

20. A computer program product comprising computer program code embodied on a non-transient computer-readable medium and configured so as when executed on a device to implement the method of claim 17.

* * * * *